Feb. 20, 1962   K. KATZOR   3,021,598
APPARATUS FOR GUIDING A PHOTOELECTRIC CELL
SENSOR IN A CIRCULAR PATH
OF ADJUSTABLE RADIUS
Filed Sept. 23, 1959
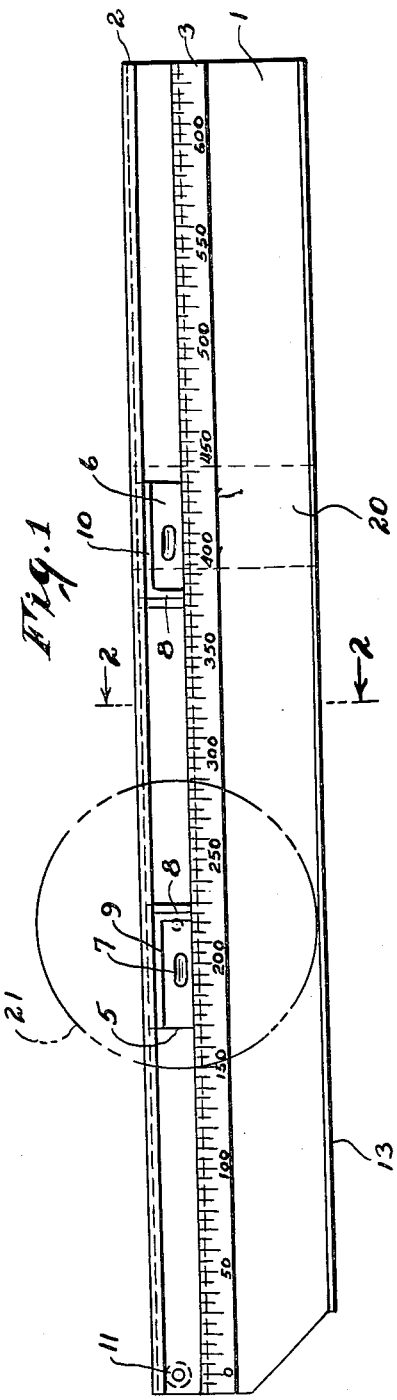
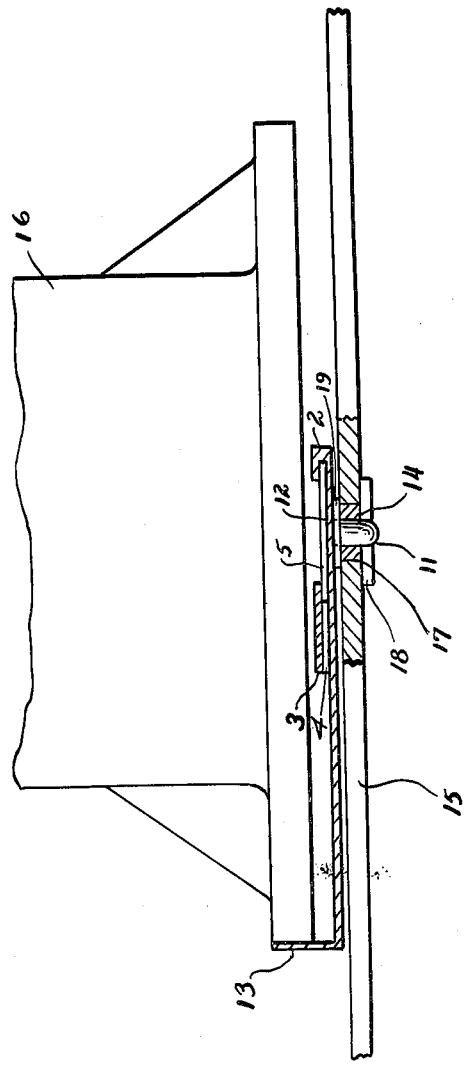
INVENTOR.
KARL KATZOR
BY
ATTORNEYS

United States Patent Office 3,021,598
Patented Feb. 20, 1962

3,021,598
APPARATUS FOR GUIDING A PHOTOELECTRIC CELL SENSOR IN A CIRCULAR PATH OF ADJUSTABLE RADIUS
Karl Katzor, Berlin, Germany, assignor to American Messer Corporation, New York, N.Y., a corporation of New York
Filed Sept. 23, 1959, Ser. No. 841,834
2 Claims. (Cl. 33—27)

This invention relates to photoelectric sensors, and more particularly, to apparatus for guiding a photoelectric sensor in a circular path of selectable radius.

Use of a photoelectric sensor, such as a sensor mounted in scanning relationship to a line drawing, for control of positioning of a work apparatus, such as a cutting torch is known to the art. In such apparatus, the photoelectric sensor will follow a path imprinted upon the scanned drawing.

In many applications it is desirable to move the sensor along a circular path of selectable radius, for example to cut a series of circular holes or discs from plate material by a sensor controlled cutting torch. However, this has required the drafting of a scale drawing having a circular path imprinted thereon. Change of radius requires drafting of a new drawing. Further storage of the drawings between intervals of use is expensive. Additionally, rapid adjustment and short set-up time is not possible when a plurality of circles of different radii are to be traversed.

It is, therefore, the object of this invention to provide a simple, economical apparatus for controlling a photoelectric sensor to move over a circular path of selectable radius.

Other objects and advantages of this invention will be pointed out hereinafter.

In accordance with these objects there is provided in a preferred embodiment of this invention, a pivotably mounted scale having a track running the length thereof. Slideably mounted within the track is a first and second guide. On each of said guides there is printed an index line extending across said guide in indexing relationship with the scale. The first guide is provided with a tracking line extending into said index line from a position between the line and said pivot. The first guide is adapted to control sensor movement in a circle starting from a position within the circle, as would be necessary to guide a flame cutting torch in a path to cut a circular hole in a material. In operation, the photoelectric sensor is positioned to scan the starting line and traverse the starting line until the sensor is over the index line. The photoelectric sensor will then move along the index line. A stop is positioned adjacent the scale which coacts with the sensor to rotate the scale about the pivot as the sensor continues to move. Rotation of the scale and index line will maintain the index line in guiding relationship to the moving sensor and the sensor will describe a circular path. To change the radius, the slide is moved along the scale until the index is positioned at the desired radius.

The second guide is provided with a starting line extending from the index line outwardly to start the sensor travel externally of the circular path.

A preferred embodiment is shown in the accompanying drawing of which:

FIGURE 1 is a plan view in accordance with this invention; and

FIGURE 2 is an enlarged sectioned view taken along lines 2—2 of FIGURE 1.

In the figures there is shown a longitudinally extending base member 1 preferably formed from a stiff, light material such as light gage metal. One edge of the base member is formed into a U-shaped channel 2. A scale 3 is mounted upon the support 4 fixedly positioned on the base. The scale is mounted in overlapping relationship to the support to form a track in co-operation with channel 2. Slideably mounted within the track are guides 5 and 6. To lessen frictional force between the guide and the tracks, it has been found advantageous to apply a dimple 7 to the guide surface. The dimple serves as the bearing point upon which the guide rides. Each of the guides is provided with an index line 8 extending into indexing relationship with the scale markings. Guides 5 and 6 are respectively provided with starting lines 9 and 10 which intersect the index lines imprinted on the face thereof.

The base member is provided with a pivot 11 extending from the surface thereof and attached thereto by such means as being peaned over into a countersunk portion 12 of the hole through which the pivot extends. Extending along the base member is an upstanding stop member 13 which may be conveniently formed by merely turning the edge thereof upwardly.

In operation the guide assembly is positioned with the pivot extending into a hole 14 in a plate 15 over which the sensor 16 travels in scanning relationship. It has been found desirable in many applications to provide an insertable bearing 17 within the hole of the scale plate to obviate the necessity of drilling the hole with bearing precision. In such cases a bearing retainer 18 is provided. To lessen frictional force between the base member and the plate 15, an annular washer is positioned around the pivot 11 and a sliding plate 20 is positioned along the base plate to prevent extreme bearing force on the pivot. To guide the photoelectric sensor in a path of selectable radius, the guide 5 is first set with the index line 8 thereon at the predetermined radius, 220 mm. in the example set forth in the drawings. The sensor is then positioned so that its axis of response is on the starting line with the direction of travel thereof towards the index line 8. The sensor will move along the starting line until it reaches the index line where it will turn to follow the index line. An example of such a photoelectric sensor operably driven over a scanned line on a drawing is set forth in application, serial No. 824,125, filed June 30, 1959, entitled Photoelectric Tracer Apparatus Employing a Second Photoelectric Cell for Path Reversal.

As the sensor moves along the index line, the light excluding flange 21 thereof will contact stop 13 and rotate base member 1 about pivot 11. This movement will move the index line in a circular path which will be followed by the photoelectric sensor.

By adjusting relative positions on the stop and index line for a sensor of known flange diameter, the incremental travel of the sensor along the index line, immediately before the flange thereof contacts the stop, will be along a line perpendicular to a radius drawn from the pivot. Thus, the sensor will trace a circular path. As the sensor follows a circular path, the controlled apparatus will also move in a circular path. For example, if the controlled apparatus were a cutting torch, the cutting torch would start to cut the material internally at the circle and then cut out a circular area in the work material. If it is desired that the material be cut in a circle to produce a disc, guide 6 will be employed on which the starting line extends radially outwardly of the index line. Thus, the sensor will start its movement externally of the circle described by it as it follows the index line. Similarly, the controlled apparatus, such as a cutting torch, will start operation externally of the circle and a disc of the material will be cut out.

It will be understood that the invention will be variously modified and embodied within the scope of the subjoined claims.

What is claimed is:

1. Apparatus for guiding a photoelectric sensor in a circular path when said sensor is positioned in scanning relationship to said apparatus comprising a longitudinally extending base member, one longitudinally extending edge of said base member being formed into a U-shaped channel, a longitudinally extending support mounted on said base member, a scale mounted on said support with the scale overhanging said support to form a track in cooperation with the U-shaped edge of said base member, the other longitudinal edge of said base member being formed upwardly to provide a stop, a first guide slidably mounted within said track, said guide carrying an index line transversely of said base member and a starting line extending longitudinally of said member and merging into said index line, and a pivot mounted at one end of said base member.

2. Apparatus as set forth in claim 1 in which said starting line extends from said pivot point towards said index line and which includes a second guide member slidably mounted within said track, said second guide member having a transversely extending index line imprinted thereon and a longitudinally extending starting line merging into said index line, said starting line extending from said index line outwardly from said pivot point.

References Cited in the file of this patent
UNITED STATES PATENTS

| | | |
|---|---|---|
| 1,820,128 | Ethridge | Aug. 25, 1931 |
| 1,825,266 | Fischer | Sept. 29, 1931 |
| 2,463,075 | Young | Mar. 1, 1949 |